A. T. BECKER.
CHAIN LOCK.
APPLICATION FILED FEB. 20, 1922.
1,414,065.                                 Patented Apr. 25, 1922.
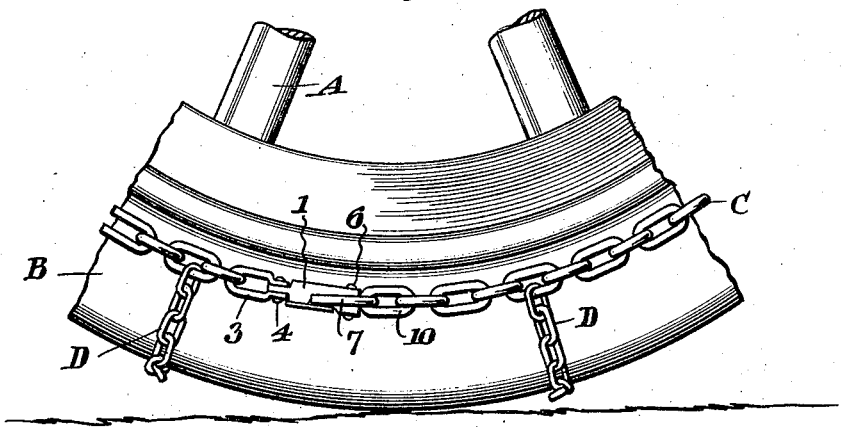
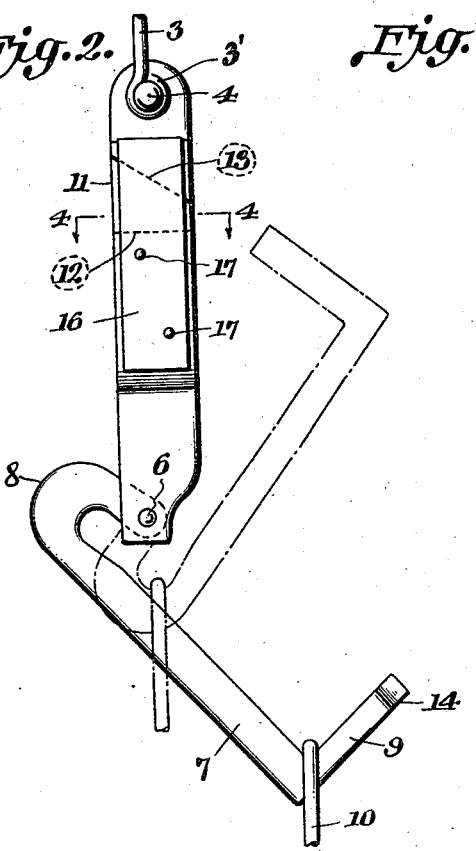
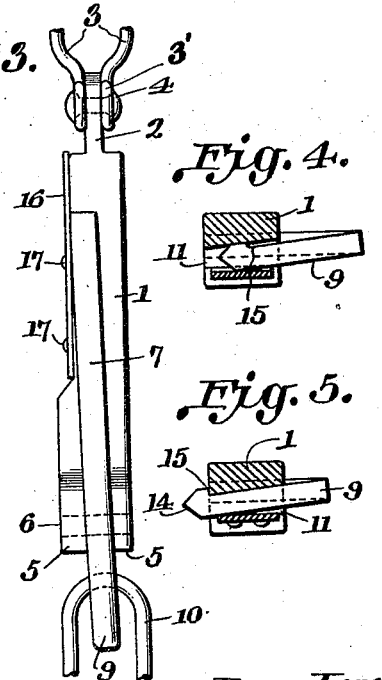
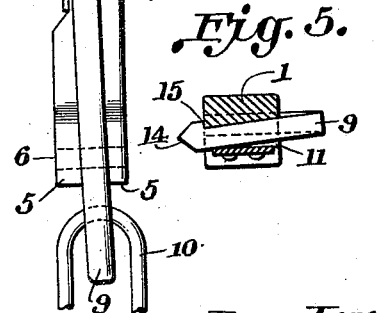
Inventor
Alfred T. Becker
by his Attorneys
Baldwin Wight

UNITED STATES PATENT OFFICE.

ALFRED T. BECKER, OF HIGHLAND, ILLINOIS.

CHAIN LOCK.

1,414,065.  Specification of Letters Patent.  Patented Apr. 25, 1922.

Application filed February 20, 1922. Serial No. 537,881.

*To all whom it may concern:*

Be it known that I, ALFRED T. BECKER, a citizen of the United States, and resident of Highland, in the county of Madison and State of Illinois, have invented certain new and useful Improvements in Chain Locks, of which the following is a specification.

In applying the usual chains to the wheels of an automobile, it is desirable to have some form of fastening for the ends of the chain that will be easily fastened and unfastened, but will at the same time not be liable to accidental unfastening.

An object of my invention is to provide a fastening or lock of this sort that will be efficient in use but thoroughly simple in construction.

Another object is to provide a fastening device that will be carried by one member of the chain so that it will not be lost when the chain is removed.

Other objects will be apparent from the following detailed description and the appended claims.

In the drawings:

Figure 1 is a perspective view of the device in use, showing a part of the wheel and chain applied thereto.

Figure 2 is a side view of the lock, with the movable member thereof shown in two positions.

Figure 3 is an edge view of the device in locked position.

Figure 4 is a section on the line 4—4 of Figure 2 showing an intermediate position of the movable member.

Figure 5 is a similar view showing the parts in locked position.

There is illustrated a portion of an automobile wheel A with the usual tire B and tire chain C provided with the short chains D connected thereto and to a similar chain on the opposite side of the tire. These parts are old and well known and may be of any desired type. They form no part of my invention in themselves.

The lock member has a body portion 1 terminating at one end in an ear 2. One link 3 of the chain is formed with an open end forming ears 3', and a suitable fastening bolt or similar member 4 is passed through the ears 2 and 3', thus fastening the lock to the chain at one end.

The opposite end of the body portion 1 is bifurcated, forming ears 5, between which is pivoted on a pin 6 the movable locking member 7. The pivot pin 6 passes through one arm of a U-shaped end 8 of the member 7, which enables the member 7 to lie parallel with and closely adjacent to the body portion 1 when it is in locking position. The opposite end of the member 7 has an extension 9 at right angles thereto. This is adapted to hook through a link 10 of the chain, as clearly illustrated in the drawings.

Near one end of the body portion 1 a groove or recess 11 is provided in the side thereof. This is slightly wider than the extension 9 at one side and flares out as shown in Figure 2, having a straight side 12 and an oblique side 13. The extension 9 terminates in a beveled end 14 which has adjacent thereto a shoulder 15 as shown in Figures 4 and 5. A spring plate 16 is attached to the body portion 1 by suitable fastenings 17 and overlies substantially the whole of the recess 11.

The dimensions of the parts are such that when the extension 9 is inserted in the recess 11 the shoulder 15 will bear against the side of the recess opposite to the plate 16, and the thickness of this end of the extension is greater than the normal space between the plate 16 and the opposing wall of the recess 11. As the extension enters the recess, the free end of the plate 16 will therefore be forced outwardly. As soon as the thick end of the extension passes out of the recess, as shown in Figure 5, the plate 16 will snap back forcing the shoulder 15 to catch behind the body 1 and holding the member 7 against accidental withdrawal.

When it is desired to remove the device, the plate 16 can be lifted in any desired way enough to permit the extension 9 to be forced out of the recess. The bevels 14 on the end of the extension 9 facilitates its entry into the recess. When the parts are in locking position, the extension 9 lies parallel to and in substantial engagement with the wall 12 of the recess.

While I have illustrated my device as used for locking an automobile chain, it is obvious that it is not limited to this use, and that it might be employed to fasten the ends of a chain, or one end with an intermediate link, wherever desired. It can also be used to fasten other similar members, and in structure and use is to be limited only by the claims.

I claim as my invention:

1. A chain lock comprising a body portion adapted to be attached at one end to a chain, and having a recess therein, a locking member attached to the other end of the body portion and having a free end to enter said recess, a shoulder on said free end, a spring plate forming one wall of the recess and engaging the locking member to force the shoulder into engagement with the body portion after it passes through the recess.

2. A chain lock comprising a body portion adapted to be attached to a chain, and having a recess therein, a locking member pivoted to the body portion and having a free end to enter the recess, a shoulder providing a detent on the free end, a spring plate having a free end forming one wall of the recess and engaging the locking member to force the detent end into engagement with the body portion after passing through the recess.

3. A chain lock comprising a body portion adapted to be fastened to a chain, and having a recess therein, a locking member pivoted to the body portion at one end and having a free beveled end to enter the recess, a shoulder affording a detent on the free end, a spring plate attached to the body portion and having a free end overlying the recess to form a wall thereof and engaging the locking member to force the detent into engagement with the body portion after it has passed through the recess and thereby prevent accidental withdrawal of the locking member.

4. A chain lock comprising a body portion adapted to be fastened to a chain, a locking member pivoted to one end thereof and adapted to pass through another link of the chain, the body portion being provided with a recess, and the locking member having a detent end adapted to pass through the recess and engage the body portion, and a spring plate overlying the recess to prevent accidental disengagement of the locking member.

5. A chain lock comprising a body portion provided with a recess, a locking member having one end pivoted to the body member and a detent on the other end adapted to pass through the recess and engage the body portion, and a spring plate attached to the body portion and overlying the recess to force the detent into engaging position and prevent accidental withdrawal of the locking member.

6. A chain lock comprising a body portion having an opening therethrough, a locking member adapted to engage a link and which is pivoted to the body portion and has a detent at one end adapted to pass through said opening, and spring means for pressing said detent into engagement with the body portion and preventing accidental withdrawal of the locking member.

In testimony whereof, I have hereunto subscribed my name.

ALFRED T. BECKER.